April 9, 1935.   E. WEISSE   1,997,130
REFLEX CAMERA WITH MOVABLE MIRROR
Filed June 22, 1932   4 Sheets-Sheet 2

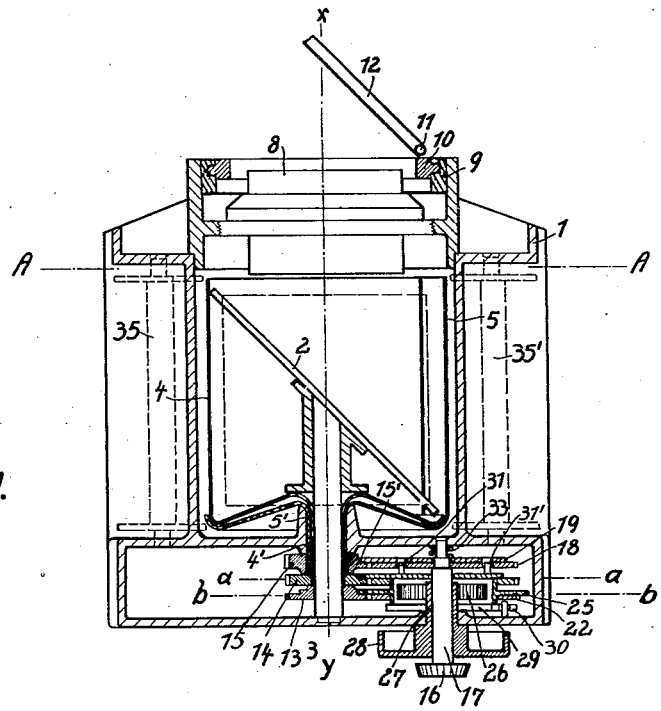
Fig. 1.
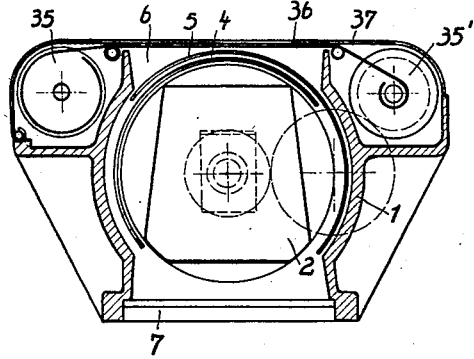
Fig. 2.
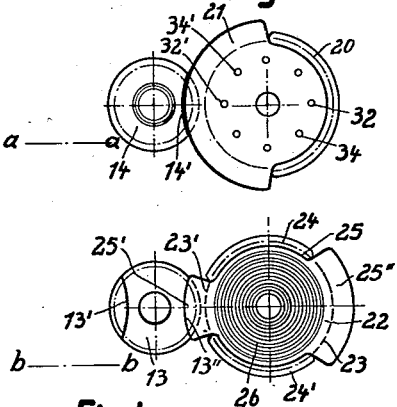
Fig. 3.
Fig. 4.

Inventor:

April 9, 1935.  E. WEISSE  1,997,130
REFLEX CAMERA WITH MOVABLE MIRROR
Filed June 22, 1932   4 Sheets-Sheet 3
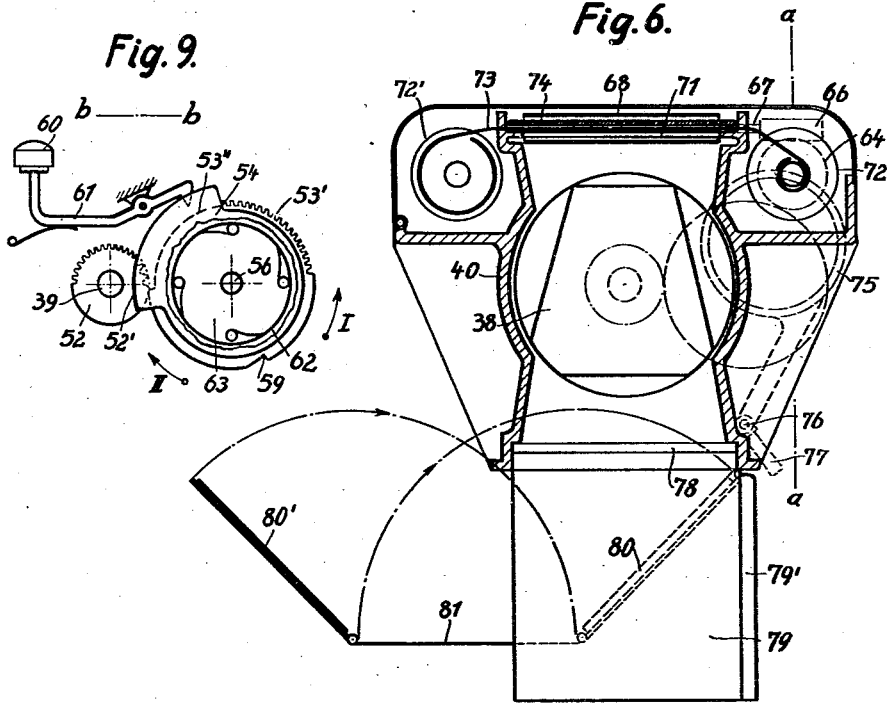
Inventor:

April 9, 1935.   E. WEISSE   1,997,130
REFLEX CAMERA WITH MOVABLE MIRROR
Filed June 22, 1932   4 Sheets-Sheet 4

Inventor:
Ernst Weisse

Patented Apr. 9, 1935

1,997,130

UNITED STATES PATENT OFFICE 1,997,130

REFLEX CAMERA WITH MOVABLE MIRROR

Ernst Weisse, Leipzig, Germany

Application June 22, 1932, Serial No. 618,791
In Germany June 27, 1931

27 Claims. (Cl. 95—42)

In the ordinary reflex cameras the mirror situated at an incline to the optical axis in the path of the rays is removed from the path of the rays during the exposure to enable direct illumination of the negative surface. As compared with these known arrangements the invention consists in that the mirror reflecting in known manner the picture on to the ground glass focussing screen projects after an oscillating movement the picture on to the negative surface, so that both the viewing and also the exposure ray paths are conducted over the reflex mirror. Such an arrangement presents considerable optical and constructional advantages.

The ground glass and the negative plane are preferably arranged symmetrical to the optical axis, and the reflex mirror is oscillatably mounted between same in the optical axis. The axis around which the reflex mirror oscillates may lie perpendicular to the optical axis and also coincide therewith. Particular advantages are derived, if a cylindrical shutter rotating around the axle around which the mirror oscillates is employed. If this axle is perpendicular to the optical axis, the shutter may consist of a simple cylinder having an aperture and which is coupled to the reflex mirror in such a manner that, when the mirror is in viewing position, the negative is covered by the cylinder and the exposure in the case of a mirror stationary in the exposing position is effected by the rotation of the shutter cylinder in such a manner, that first the ray passage between the mirror and the negative is liberated and, if the cylinder is further rotated, is interrupted between mirror and lens. The mirror on the one hand, can release the shutter cylinder by abutting in the exposure position which cylinder, on the other hand, releases after its operation the mirror and brings same into the viewing position. Whereas, in such an arrangement separate sources of power are necessary for the movement of the mirror and the shutter, the transmission elements for the mirror and shutter drive can engage in a common driving mechanism, and thereby bring at least the transmission element for the mirror temporarily out of engagement. The transmission elements are preferably locked as long as they are out of engagement. For this purpose the transmission elements can cooperate with the driving mechanism as ratchet gear. If the axis around which the reflex mirror oscillates coincides with the optical axis, the cylinder shutter may consist of two part cylinders leaving free an adjustable slot and driven independently the one of the other.

The adjusting of the width of the slot may then be effected in a simple manner by mutually adjusting the driving mechanism engagements of the part cylinder.

The reflex mirror may be coupled with a blind shutter. If a common driving mechanism is employed for the mirror and for the blind shutter, it is advisable in order to avoid backward movements of the shutter, to arrange the film in known manner between an endless running band, leaving an adjustable slot free. In this instance the arrangement may be such, that the shutter transmission element remains permanently in engagement with the driving mechanism, whereas only the mirror transmission element disengages temporarily therefrom.

The reflex mirror may also be combined with a blade (lens) shutter. In the known blade shutters the movement of the blades is effected by the reciprocating movement of a control ring, the blades being arranged outside the control ring. In order to avoid the retrograde movement of the control ring, the blades may be mounted or guided on two concentric control rings, rotatable only in like direction, so that the blades in the case of inner stationary and outer movable control ring are moved in one direction and in the case of movable inner and stationary outer control ring in the other direction. As the two control rings rotate in the same direction both during the opening and during the closing of the blades, they can easily be brought into engagement with the common driving mechanism for the mirror and shutter. By mutual adjusting of the driving mechanism engagements of the control rings a variation of the exposure times can be effected.

If the reflex mirror is connected with a lens shutter, it is advisable to effect the focussing not as is generally the case by shifting the lens but by a corresponding shifting of the focussing screen and negative plane. The coupling between the lens shutter and the reflex mirror can then always remain unchanged.

In this instance the camera case is preferably composed of three telescopic parts, the middle part of which contains the lens, lens shutter and mirror together with the coupling elements, the upper part the focussing screen and the lower part the negative. The lens may be arranged countersunk, so that it is covered by the side walls of the two other parts when the camera is in closed condition.

In order to prevent the production of reversed pictures, a second reflecting surface may, according to the invention be interposed in the path of the exposure rays. For example the lens may be directed vertically upwards, the negative and focussing screen arranged vertical and a mirror inclined at 45° to the optical axis placed in front of the lens. The mirror is preferably made foldable, so that it serves at the same time as protection for the lens. The position of this reversing mirror relative to the reflex mirror can be altered. The reversing mirror may for example be arranged oscillatable around the optical axis, so that when the photographer is looking in the same direction it is possible to take photographs in different directions. The reversing mirror is preferably mounted on a bayonet ring, which is inserted easily exchangeable on the lens, lens carrier or camera case. If the reversing mirror is divided and the two parts are arranged mutually inclined at an angle, two half size pictures are simultaneously produced which can be employed as stereoscopic pictures. The angle of inclination of the two reversing mirror parts is preferably changeable, so that for ordinary photographs they can be laid flat and inclined more or less for stereoscopic photographs according to the distance of the object.

As a rule the focussing screen picture in reflex cameras appears the right way up, the sides being however reversed. In a camera according to the invention the observation of a picture standing upright the sides being correct is possible, if the reversing mirror and the focussing screen are directed towards the object to be photographed and the focussing screen picture is viewed through the intermediary of two mirrors arranged at an angle to one another in front of the focussing screen. As the lens is difficult of access from the front, owing to the reversing mirror, and as it is consequently difficult to fit filters thereon, it is advisable to arrange one or several yellow or ruby filters between lens and reflex mirror in such a manner, that they can be oscillated or shifted into the path of the rays from the outer side.

Three embodiments of the invention are illustrated by way of example in the accompanying drawings in which:—

Fig. 1 is a vertical section through the camera, the reflex mirror being turned through 90° to the viewing position for the sake of clearness.

Fig. 2 is a horizontal section on line A—A of Fig. 1.

Fig. 3 is a horizontal section through the controlling gear on line a—a of Fig. 1.

Fig. 4 is a horizontal section through the controlling gear on line b—b of Fig. 1.

Fig. 6 is a horizontal section of Fig. 5.

Fig. 9 is a part section on line b—b of Fig. 5.

Figure 7:
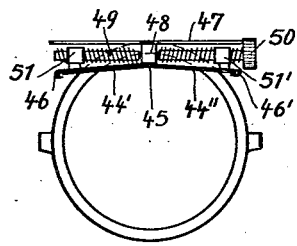
Fig. 7 is a vertical section of a reversing mirror arranged in front of the lens which for the sake of clearness is shown vertical in the drawings.
Figure 8:
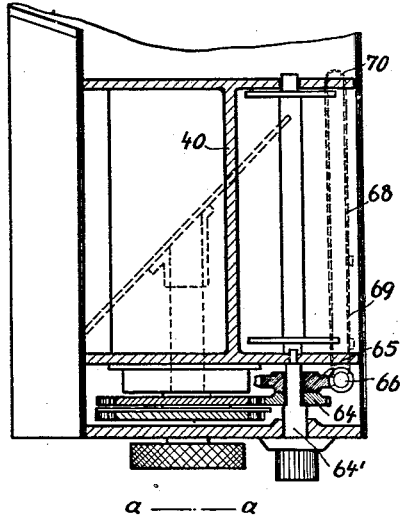
Fig. 8 is a section through the camera on line a—a of Fig. 6.
Figure 5:
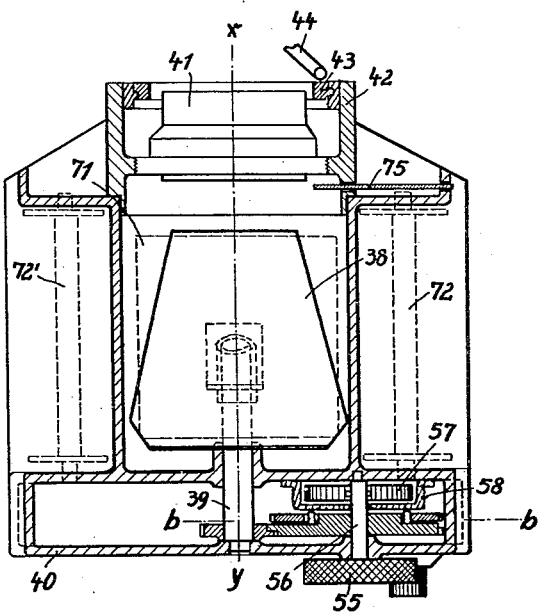
Fig. 5 is a vertical section through a second form of construction.
Figure 10:
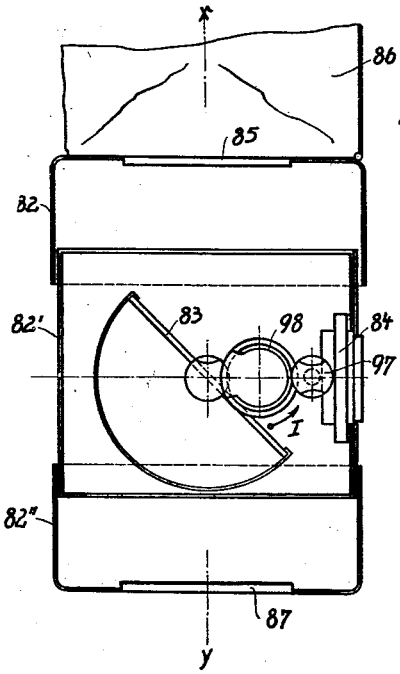
Fig. 10 shows in side elevation a camera with the side wall removed.
Figure 11:
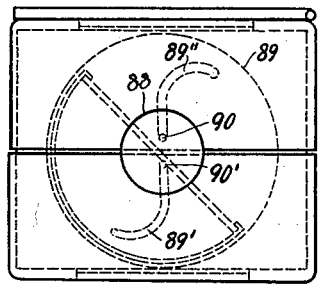
Fig. 11 shows the camera in closed condition.

In Figs. 1 to 4 a reflex mirror 2 inclined at an angle of 45° to the optical axis $x$—$y$ is rotatably mounted on a shaft 3 in the cylindrical middle portion of a camera case 1. Two part cylinders 4, 5 are mounted concentric to the shaft 3, sleeves 4', 5' acting as hollow shafts surrounding the shaft 3. In their initial position the part cylinders 4, 5 are situated so that their exposure aperture 6 in the case 1 is covered, whereas the focussing screen 7 is not covered.

The lens 8 together with a cylindrical lens carrier 9 are arranged in the case 1 shiftable in the optical axis $x$—$y$ by means of a worm arrangement not shown in the drawings. In the lens carrier 9 a bayonet ring 10 is inserted, which can be turned concentrically to the optical axis $x$—$y$. A mirror 12 is hingedly connected to the bayonet ring 10 by means of a hinge 11 and can be folded down when the camera is not in use and set at an angle of 45° to the axis $x$—$y$ for taking a photograph. A toothed wheel 13 is keyed on the shaft 3 and has two arcuate recesses 13', 13" mutually displaced through 180°. Toothed wheels 14, 15 are keyed one on each of the two sleeves 4', 5'. The toothed wheels 14, 15 have each an arcuate recess 14', 15' respectively. A toothed-wheel 18 having teeth only on one half of its circumference and keyed on a shaft 17 provided with an adjusting knob 16 meshes with the toothed wheel 15. A cam disc 19 is rigidly connected to the toothed wheel 18 and runs in the recess 15' as long as the portion of the toothed wheel 18 having no teeth is moved along the toothed wheel 15. The length of the toothed portion of the toothed wheel 18 is so chosen that during a complete development the toothed wheel 15 carries out a complete revolution.

In a similar manner a toothed wheel 20 with a cam disc 21 cooperates with the toothed wheel 14 (see Fig. 3). A toothed wheel 22 having two toothed portions 24, 24' separated by toothless gaps 23, 23' meshes in the toothed wheel 13. The toothed wheel 13 can be rotated through 180° by each of the toothed portions 24, 24'. A cam disc 25 rigidly connected with the toothed wheel 22 rotates with two cams 25', 25" during the travel of the tooth gaps 24, 24' in the recesses 13' and 13". The toothed wheel 20, the cam disc 21, the toothed wheel 22 and the cam disc 25 are rigidly connected and form a housing loosely mounted on the shaft 17 and accommodating a spiral spring 26 the outer end of which is fixed on the housing. The inner end of the spring 26 is hooked on to a hollow shaft 27 running on the shaft 17. The hollow shaft 27 can be rotated from the outer side by a winding knob 28. A ratchet wheel 29 with pawl 30 prevents the hollow shaft 27 from turning backwards. Clutch pins 31, 31' are fixed on the toothed wheel 18 and engage in corresponding holes 32, 32' in the cam disc 21. If the shaft 17 is shifted in axial direction against the pressure of a spring 33, the clutch pins 31, 31' disengage and can be again brought into engagement with other holes 34, 34' during a turning of the shaft 17. Film spools 35, 35' are mounted in the case 1 parallel to the optical axis $x$—$y$. The film 36 is pressed flat against the exposure aperture 6 of the case 1 by a hinged cover 37.

The arrangement above described operates in the following manner:—

In the initial position the reflex mirror 2 is directed towards the focussing screen 7 on to which the picture is projected by the lens 8. The path of the rays extends over the inclined mirror 12 which can be turned as desired in the bayonet ring 11. Without altering the position of the camera different pictures are produced on the focussing screen according to whether the mirrors 12 and 2 are plane parallel or relatively turned through 90 or 180°. The film 36 is covered by the part cylinder 4, 5 in the initial position. The spring 26 is wound by turning the winding knob 28. The spring housing 20, 21, 22, 25 is first held in its position by a releasing device not shown in the drawings. On being released the entire driving mechanism 20, 21, 22, 25, 18, 19 performs a complete revolution. During this revolution the cam 25' first slides out of the recess 13", the toothed portion 24 rotates the toothed wheel 13 and consequently the mirror shaft 3 with the reflex mirror 2 through 180°. The picture, when the reflux mirror 2 is in this position, is projected on to the negative plane which is still covered. As the driving mechanism continues to rotate, the mirror 2 is held in this so-called exposure position by the cam 25" and the recess 13'. Owing to the meshing of the toothed wheel portions 18 and 20 the toothed wheels 14 and 15 and therefore the shutter cylinders 4, 5 rotate through a complete revolution and thereby expose the film 36. The meshing of the toothed portions 18, 20 takes place however at such a moment that the exposure aperture between the two part cylinders 4, 5 only slides over the exposure aperture 6 when the mirror 2 is locked in the exposure position by the cam 25" and recess 13'.

After the driving mechanism 20, 21, 22, 25, 18, 19 has completed a full revolution both the mirror 2 and also the cylinder parts 4, 5 are again in their initial position. If during the above described operation of the shutter the meshing of the two toothed portions 18, 20 takes place at the same time, no mutual displacement of the two part cylinders 4, 5 occurs during the revolution. If however the toothed portions 18, 20 are mutually displaced by disengagement of the clutch elements 31, 31' and turning of the shaft 17 by means of the adjusting knob 16, so that these toothed portions engage the toothed wheels 14, 15 successively, the part cylinders 4, 5 shift during the running down and form a larger or smaller exposure aperture, so that the exposing time is altered.

In the construction illustrated in Figs. 5 to 9 the reflex mirror 38 is mounted with its shaft 39 in the case 40 in the optical axis $x$—$y$ of the lens 41. A bayonet ring 43 with a reversing mirror 44 mounted thereon is rotatably inserted in the shiftable lens carrier 42, concentrically to the lens 41 as in the first form of construction. The reversing mirror 44 consists of two parts 44' and 44" (Fig. 7) which can be oscillated around their abutting edge 45. Springs 46, 46' each press one of the mirror parts 44', 44" flat against a common mirror carrier 47 hingedly mounted on the bayonet ring 43. A spindle 49 with right and left screw thread is journaled in a lug 48 of the mirror carrier 47 and, when this spindle is rotated by an adjusting knob 50, two wedges 51, 51' provided with female screw threads are shifted in opposite directions. The wedges 51, 51' slide under the mirror parts 41', 41" so that these can be mutually inclined more or less against the action of the springs 46, 46'. A yellow filter 75 is oscillatably mounted in the case 40 on an axle 76 in such a manner that it can be oscillated into the path of the rays from the lens 41 by means of a lever 77 projecting from the case.

A driving wheel 52 having teeth around half its circumference and provided with an arcuate recess 52' is keyed on the mirror shaft 39. A toothed portion 53' of a pinion 53 rigidly fixed on a cam disc 54 engages with the toothed wheel 52. The cam disc 54 runs in the recess 52' and covers a tooth gap 53" in the pinion 53. During the development of the toothed portion 53' the mirror shaft toothed wheel 52 is rotated through 180°. The pinion 53 is keyed on a shaft 56 provided with a winding knob 55 and rigidly connected to the inner end of a spiral spring 57. The outer end of the spiral spring 57 is attached to a spring cap 58 fixed on the case 40. The pinion 53 is provided with an incision 59 in which, after a half revolution in the direction of the arrow I (winding direction) a spring controlled pawl 61 provided with a releasing knob 60 engages. A toothed wheel 62 is connected with the pinion 53 by a free wheel 63 in such a manner, that the toothed wheel remains at a standstill during the winding movement of the pinion 53 in the direction of the arrow I, but is rotated during the running down movement of the pinion 53 in the direction of the arrow II. The toothed wheel 62 meshes with a toothed wheel 64 loosely mounted on a shaft 64' and rigidly connected with a worm wheel 65. The worm wheel 65 drives a worm 66 keyed on the lower feed shaft 67 on an endless blind 68. The blind 68 is provided with an exposure slot 69 and travels as an endless band over the lower feed shaft 67 and over an upper feed shaft 70 and surrounds the side wall of the case 40 having the exposure aperture. The film spools 72 and 72' are, as in the first form of construction, mounted in the case 40 parallel to the optical axis $x$—$y$. The film 73 is conducted under a pressure plate 74 between the endless blind and pressed by the plate 74 against the exposure aperture 71. Opposite the exposure aperture 71 a focussing screen 78 is accommodated in the case 40 and protected by a foldable light screen hood 79. Two viewing mirrors 80 and 80', adjustable at an angle the one to the other and hingedly connected to an intermediate element 81, can be folded out of the box-shaped side wall 79' of the light screen hood.

This form of construction operates in the following manner:

By turning the winding knob through a half revolution in clockwise direction the spring 57 is wound and the shaft 59 turned with the mirror 38 through 180° into the viewing position by means of the toothed portion 53'. The free wheel clutch 63 prevents the toothed wheel 62 and blind shutter from participating in the rotation during the winding. The pinion 53 is held after the winding until released, owing to the engagement of the releasing pawl 61 in the incision 59. When the reflex mirror 38 is in the viewing position, a picture will be projected by the lens 41 on to the focussing screen 78. Normally the mirror parts 44 and 44' lie flat in the plane of the mirror carrier 47 and act like a flat mirror. The abutting edges of the mirror parts 44', 44" in no way disturb the picture on the focussing screen as they are not in focus. The mirror carrier 47 or the mirrors 44', 44" can be turned through 90°, 180° or 270° in the bayonet ring 43 relative to the reflex mirror. If for example the mirrors 44', 44" and the focussing screen are directed towards the object to be photographed, it is possible by means of the angular mirrors 80, 80' adapted to be folded out of the light screen hood 79 to view the picture on the focussing screen in the form of a reproduction of the article to be photographed the right way up and the right way round. If the mirrors 44', 44" are mutually inclined by turning the spindle 49, two pictures of the object to be photographed, each half the size of the complete picture, can be stereoscopically viewed on the focussing screen when the mirrors are at a certain angle. The yellow filter 75 can be conveniently brought into operative position by depressing the lever 77 irrespective of the position of the mirror carrier 47.

In order to photograph the picture focussed on the focussing screen, the releasing lever 60 is depressed which liberates the driving mechanism 53, 54, 62 so that it can perform a half revolution in the direction of the arrow II under the influence of the spring 57. The mirror shaft 39 is thereby rotated through 180° so that the reflex mirror 38 projects the picture on to the still covered film 73. The toothed wheel 62 is rotated during the running down movement by the free wheel 63 so that the endless band is operated through the intermediary of the toothed wheel 64, the worm wheel 65 and the worm 66. The exposure slot however then first comes in front of the exposure aperture 71 when the mirror 78 is held in the photographing position by the engagement of the cam disc 54 in the recess 52' of the pinion 52. After the termination of the running down movement of the driving mechanism 53, 54, 62 the exposure aperture 71 is again closed by the blind which then assumes the position illustrated.

According to the construction illustrated in Figs. 10 to 13 the camera case consists of three parts 82, 82', 82" fitting box-like one in the other. The middle part 82 contains the oscillatably mounted reflex mirror 83, the lens 84, a shutter which will be hereinafter described and the driving mechanism, whereas the upper part 82' accommodates the focussing screen 85 with light screen hood 86 and the lower case part 82" accommodates the film support 87.

Figure 12:
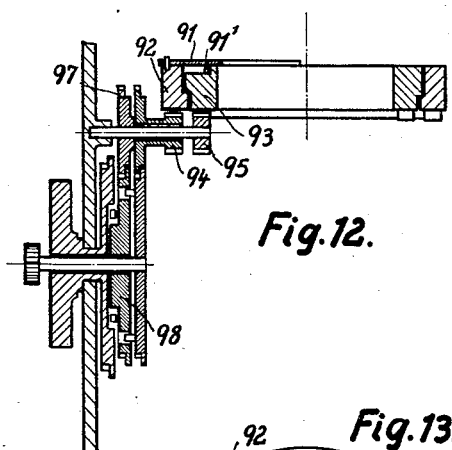
Fig. 12 is a longitudinal section through the shutter drive.
Figure 13:
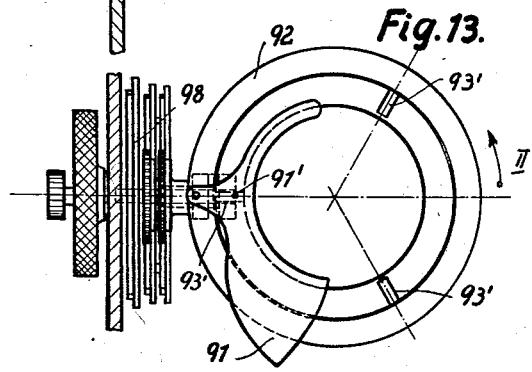
Fig. 13 is a front elevation of Fig. 12.

In the middle case part 82 a cam disc 89 rotatable by means of an adjusting knob 88 is mounted and in the races 89', 89" of this disc slide two guide pins 90, 90' fixed one on the upper case part 82 and the other on the lower case part 82". By turning the cam disc 89 the case parts 82, 82" are moved apart or approached symmetrically to the optical axis $x—y$ to enable the focussing of the picture. When the camera is in closed position, the side walls of the upper and lower case parts cover the countersunk lens 84. In Figs. 12 and 13 only one of the blades 91 of the blade shutter built in the lens 84 is shown for the sake of clearness. The blades are mounted on a ring 92 and carry a guide pin 91' engaging in radial slots 93' of another ring 93. The rings 92 and 93 have teeth on their rear side which mesh each with a pinion 94, 95 respectively. The pinion 94 is connected with a driving toothed wheel 96 and the pinion 95 with a toothed wheel 97. A ratchet gear 98 with toothed portions and cam discs engages in the driving toothed wheels 96 and 97 in the manner above described. The ratchet gear 98 also acts on a driving tooth wheel 99 keyed on the axle of the reflex mirror 83 in the manner already repeatedly described above. The cam and toothed wheel engagements of the ratchet gear 98 are so arranged that, as this gear 98 runs down in the direction of the arrow I, the outer ring 92 is first turned in the direction of the arrow II by means of the transmission elements 96, 94 whereby the shutter blades 91 are closed towards the middle. As the ratchet gear 98 continues to operate, the toothed wheel 99 is engaged and the mirror 93 oscillated through 90° into the photographing position, whereupon the ring 93 is likewise turned in the direction of the arrow II by the engagement of the toothed wheel 97 by means of the pinion 95, and the shutter opened. By a second engagement in the toothed wheel 96 and rotation of the ring 92 resulting therefrom the shutter is again closed and the exposure terminated.

The engagements of the ratchet gear 98 in the toothed wheels 96, 97 can be mutually adjusted in the manner above described so that the time of exposure by the shutter can be changed.

I claim:—

1. A reflex camera, comprising in combination a case adapted to carry the sensitized element and a lens, a focussing screen in said case, a mirror in said case at an incline to the optical axis of said lens arranged within the rear side of the lens and the plane of the picture and being adapted to reflect the picture onto said focussing screen, and means for oscillating said mirror to project the picture hitherto visible on said focussing screen onto said sensitized element.

2. A reflex camera as specified in claim 1, comprising in combination with the focussing screen and the sensitized element arranged symmetrically to the optical axis of the camera, a mirror oscillatably mounted in said optical axis.

3. A reflex camera as specified in claim 1, comprising in combination with the lens, and the mirror, a second reflecting surface in the path of the photograph rays arranged beyond the rear side of the lens and the plane of the picture and being adapted to serve as a reversing mirror and to produce a true position picture.

4. A reflex camera as specified in claim 1, comprising in combination with the lens directed upwardly and the sensitized element and focussing screen vertically arranged, an inclined mirror arranged in front of said lens adjustable to the optical axis.

5. A reflex camera as specified in claim 1, comprising in combination with the case, a filter oscillatably mounted in said case and being adapted to serve as a reversing mirror and to filter rays of a certain kind, and means for bringing said filter into operative position in the path of the photograph rays from the outer side of said case.

6. A reflex camera as specified in claim 1, comprising in combination with the inclined mirror in the case, a reversing mirror on said case arranged beyond the rear side of the lens and the plane of the picture and being adjustable relative to said mirror.

7. A reflex camera as specified in claim 1, comprising in combination with the lens, a reversing mirror in front of said lens arranged beyond the rear side of the lens and the plane of the picture and being adapted to be turned relative around the optical axis.

8. A reflex camera as specified in claim 1, comprising in combination with the case carrying the lens, a guide ring on said case surrounding the lens, a second ring rotatable in said guide ring, and a reversing mirror hingedly mounted on said rotatable ring.

9. A reflex camera as specified in claim 1, comprising in combination with the lens, a guide ring on said lens, a second ring rotatable in said guide ring, and a reversing mirror hingedly mounted on said rotatable ring.

10. A reflex camera as specified in claim 1, comprising in combination with the lens, a carrier for said lens, a guide ring on said carrier, a second ring rotatable in said guide ring, and a reversing mirror hingedly mounted on said rotatable ring.

11. A reflex camera as specified in claim 1, comprising in combination with the case carrying the lens, a divided mirror mounted on said case in front of said lens and being composed of parts adapted to be mutually inclined.

12. A reflex camera as specified in claim 1, comprising in combination with the case carrying the lens, a divided reversing mirror mounted on said case in front of said lens and being composed of several parts, a spindle, wedges shiftable in opposite directions on said spindle, and means for rotating said spindle to shift said wedges to adjust the inclination of said mirror parts.

13. A reflex camera as specified in claim 1, comprising in combination with the oscillatable reflex mirror, a shutter cylinder with exposure slot rotatable around said reflex mirror the axis of said cylinder coinciding with the axis of oscillation of said mirror.

14. A reflex camera as specified in claim 1, comprising in combination with the mirror, a shutter, a common driving mechanism for said mirror and said shutter, and means for temporarily disengaging said mirror from said driving mechanism.

15. A reflex carrier as specified in claim 1, comprising in combination with the mirror, a shutter drive, a common driving mechanism for said mirror and said shutter drive, transmission elements between said driving mechanism and said mirror and said shutter drive adapted to cooperate with said driving mechanism as ratchet gear to lock the transmission elements which are not in engagement.

16. A reflex camera as specified in claim 1, comprising in combination with the oscillatable reflex mirror, a pivot axle carrying said mirror coinciding with the optical axis of the cemera, a cylindrical shutter composed of two part cylinders with an intervening gap said part cylinders being rotatable around the axis of oscillation of said mirror, and means for adjusting the width of the gap between said part cylinders.

17. In a reflex camera as specified in claim 1 a blade shutter composed of blades and two concentric control rings rotatable only in one direction adapted to carry and guide said blades, a driving mechanism adapted to alternately drive said rings to cause said blades to move in one direction when the inner of said rings is stationary and the other rotated and in the other direction when the outer of said rings is stationary and the other rotated.

18. In a reflex camera as specified in claim 1, comprising in combination a shutter, operating elements for said shutter, a driving mechanism adapted to actuate said elements, and means for mutually adjusting the engagement of said elements with said driving mechanism in accordance with the exposure time.

19. A reflex camera as specified in claim 1, comprising in combination with the focussing screen, the sensitized element and the reflex mirror, a lens shutter connected with and unchangeable in position relative to said mirror, and means for shifting said focussing screen and the plane of said sensitized element relative to one another and to the mirror as well as dependently upon one another to effect the focussing of the picture.

20. A reflex camera as specified in claim 1, comprising in combination with the case, the lens, the mirror and the focussing screen, a shutter driving mechanism and a mirror driving mechanism, said case composed of three parts shiftable box-like the one in the other, the middle of said parts carrying said lens, said mirror, and said driving mechanisms, the upper of said parts carrying said focussing screen and the lower of said parts carrying said sensitized element the upper and the lower of said parts being shiftable in opposite direction parallel to the optical axis.

21. A reflex camera as specified in claim 1, in which the case is made in three parts, and the lens is countersunk in the middle of said parts of said case, and, when the camera is in closed condition, is covered by the side walls of said other parts of said case.

22. In a reflex camera as specified in claim 1 the employment of a blind shutter extending around the sensitized element in the form of an endless band.

23. A reflex camera as specified in claim 1, comprising in combination with the lens, a reversing mirror in front of said lens arranged beyond the rear side of the lens and the plane of the picture and being adapted to be folded down on to said lens.

24. A reflex camera as specified in claim 1, comprising in combination with the inclined mirror in the case, a reversing mirror on said case composed of two parts forming an angle.

25. A reflex camera as specified in claim 1, comprising two auxiliary mirrors, thhe first of which is adjustably inclined to the ground glass focussing screen and the second is adjustably inclined to the first mirror and extends laterally over the side wall of the camera so that the ground glass focussing screen picture can be viewed over the two mirrors arranged at an angle to each other.

26. A reflex camera as specified in claim 1, comprising in combination with the oscillatable reflex mirror, a shutter cylinder with exposure slot rotatable around said reflex mirror, the axis of said cylinder coinciding with the axis of oscillation of said mirror, a common driving mechanism for said mirror and said shutter, and means for temporarily disengaging said mirror from said driving mechanism.

27. A reflex camera as specified in claim 1, a blade shutter composed of blades and two concentric control rings, one of said rings serving as a bearing for the blades and the other ring being provided with guide slots for controlling the blades, and a common driving mechanism for the mirror and the shutter, substantially as and for the purposes set forth.

ERNST WEISSE.